No. 863,270. PATENTED AUG. 13, 1907.
H. FIEDELER.
APPARATUS FOR TURNING AND BOWING THE HEADS OF DOLLS.
APPLICATION FILED JULY 27, 1906.
2 SHEETS—SHEET 1.
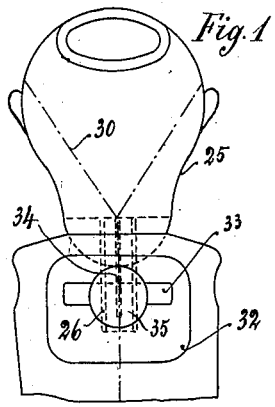
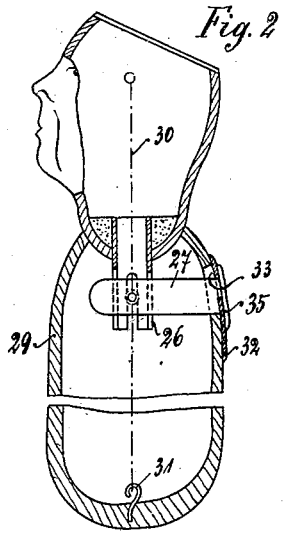
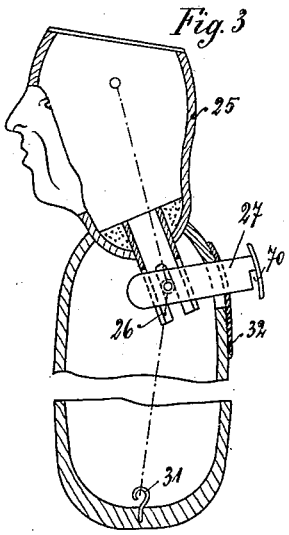
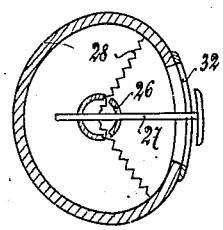
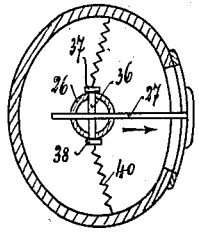
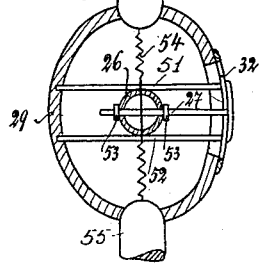
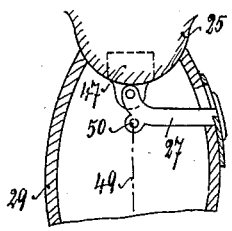
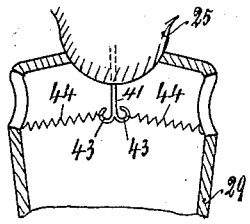
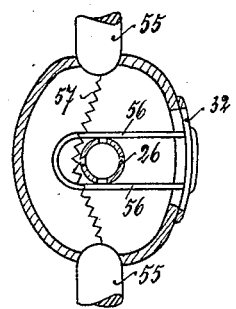
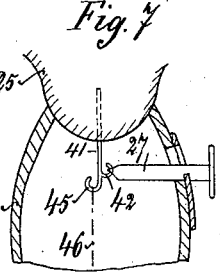
Witnesses:
William Schulz
Arthur ....
Inventor:
Hermann Fiedeler
by Frank v. Briesen Atty.

No. 863,270. PATENTED AUG. 13, 1907.
H. FIEDELER.
APPARATUS FOR TURNING AND BOWING THE HEADS OF DOLLS.
APPLICATION FILED JULY 27, 1906.
2 SHEETS—SHEET 2.
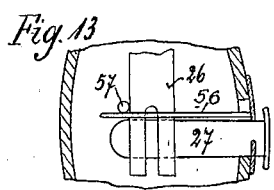
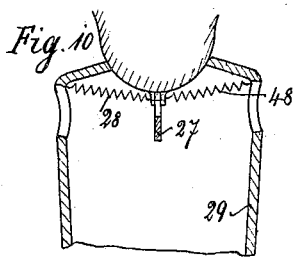
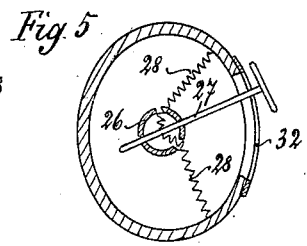
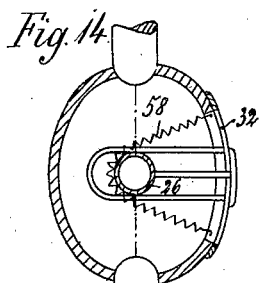
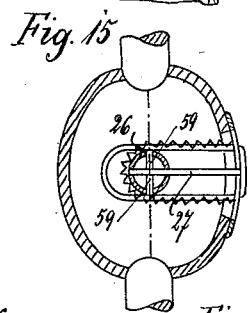
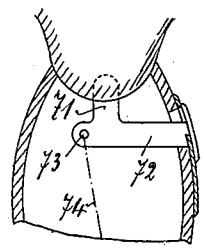
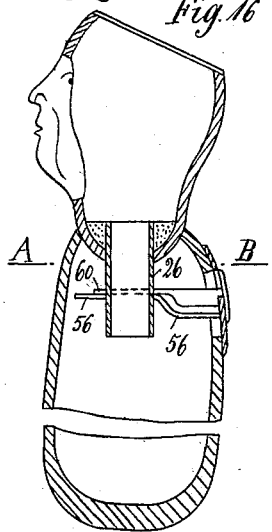
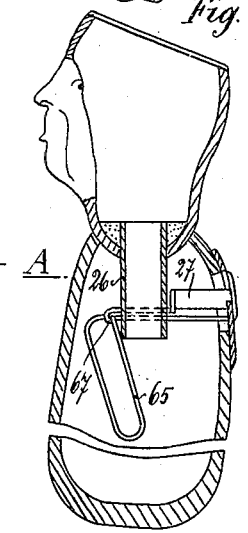
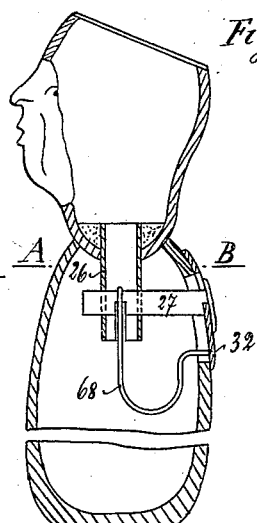
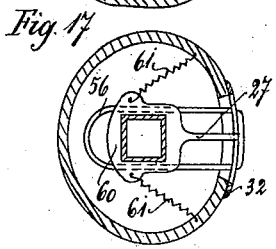
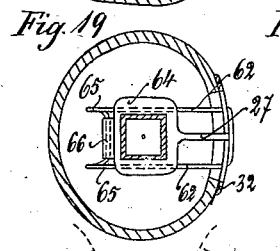
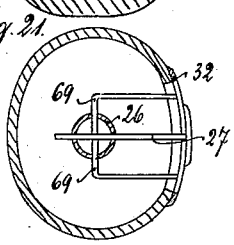
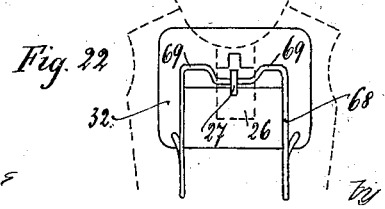
Witnesses:
William Schulz
Arthur ___
Inventor:
Hermann Fiedeler,
by Frank v. Briesen Atty.

UNITED STATES PATENT OFFICE.

HERMANN FIEDELER, OF DOEHREN, NEAR HANOVER, GERMANY.

APPARATUS FOR TURNING AND BOWING THE HEADS OF DOLLS.

No. 863,270.    Specification of Letters Patent.    Patented Aug. 13, 1907.

Application filed July 27, 1906. Serial No. 327,984.

*To all whom it may concern:*

Be it known that I, HERMANN FIEDELER, landowner, a subject of the Emperor of Germany, residing at Doehren, near Hanover, Germany, have invented new and useful Improvements in or Relating to Apparatus for Turning and Bowing the Head of a Doll, of which the following is a specification.

This invention relates to a device for enabling the head of a doll to be turned and bowed.

As compared with well known devices of similar kind, the moving mechanism is simplified by connecting the head with a spring arranged in the body, the spring tending to keep the head in a given position.

Further improvement lies in the provision of a lever engaging with the head and projecting from the back of the doll which lever when operated serves to effect the bowing and turning movements of the head.

In the accompanying drawings: Figure 1 is a rear view of a dolls head embodying my invention; Fig. 2 a vertical section thereof; Fig. 3 a similar section showing the parts in a different position; Fig. 4 a cross section of Fig. 2; Fig. 5 a similar section showing the parts in a different position; Fig. 6 a cross section of a modification; Fig. 7 a vertical section of a further modification; Fig. 8 a similar section at right angles to Fig. 7; Fig. 9 a vertical section of a further modification; Fig. 10 a similar section at right angles to Fig. 9; Fig. 11 a horizontal section of a further modification; Fig. 12 a horizontal section of a further modification; Fig. 13 a vertical section thereof; Fig. 14 a horizontal section of a further modification; Fig. 15 a horizontal section of a further modification; Fig. 16 a vertical section of a further modification; Fig. 17 a horizontal section on line A—B, Fig. 16; Fig. 18 a vertical section of a further modification; Fig. 19 a horizontal section on line A—B, Fig. 18; Fig. 20 a vertical section of a further modification; Fig. 21 a horizontal section on line A—B, Fig. 20; Fig. 22 a side elevation of part of Fig. 20, and Fig. 23 a vertical section of a further modification.

To the head 25 of the doll (Figs. 1–3) is attached a hollow extension or stem 26 which enters the doll-body 29 through an upper opening thereof. Rod 26 is split at the lower end so that two pairs of slots are produced, one of which pairs accommodates the lever 27 (Fig. 4) by means of which the head is to be moved, while through the other pair of slots passes a spring 28, the ends of which are secured to the body 29. Lever 27 passes into body 29, and its outer exposed end is adapted to engage a plate 32 sunk into said body. The head 25 is mounted on the body 29 in the usual way by means of a ball joint, and is held by a spring band 30, one end of which is secured to two sides of the head, and the other end to a hook 31 provided within the lower part of the body. The points of attachment of the spring 28, as will be seen in Fig. 4 are slightly set back, so that the spring exercises a backward pull on the extension 26.

In order to keep the head in the normal position, shown in Fig. 2, the lever 27, in combination with the plate 32, is made of a special shape. The plate 32 is secured in a recess in the back of the doll and provided with a slot 33 the central portion of which is widened as at 34. The width of the lever 27 corresponds to that of the slot 33 only at the point where the widened or recessed portion 34 is situated, so that a longitudinal movement of the lever 27 in the slot 33 is only possible at that place.

If it is desired to have several places at which it should be possible to move the lever 27 longitudinally a corresponding number of widened portions of the same kind as the widened portion 34 must be arranged. The lever 27 is provided at its outer end with a slot or reduced portion 70 so that the thickness of the lever 27 at that point corresponds approximately to the width of the slot 33, and therefore the lever 27 can be moved laterally in the slot 33 the slot 70 engaging over the bottom edge of the slot 33. For forming a larger surface of engagement for the finger which moves the lever 27, the latter is provided at the end with a button or finger piece 35 which can be formed into a cap.

If when the parts are in the position shown in Fig. 2 the button 35 is raised so that the slot or notch 7 is raised above the edge of the plate 32, the spring 28 becomes operative and pulls the extension 26 backwards, so that the head 25 bows, moving into the position shown in Fig. 3. For turning the head, the lever 27 is moved laterally, for instance, into the position shown in Fig. 5. The spring 28 can easily be made of such shape or arranged in such manner, that it also has the tendency to return the head to the normal position from the position shown in Fig. 5.

In the construction shown in Fig. 6 the lever 27 engages with a cross pin 36 passing through lateral slots of the extension 26, and provided at its outer ends with widened portions or disks 37 38 for the purpose of preventing shifting. To the said disks 37 38 are secured springs 39, 40 the other ends of which are secured to the body of the doll to form an acute angle with the lever 27 so that they exercise a pull on the extension 26 in the direction of the arrow, the result of which is that, when the lever 27 is released, the head bows.

In the construction shown in Figs. 7 and 8, the rod 41 projecting from the head has several hooks formed at its end. Of these the hook 42 is connected to the setting lever 27 while springs 44 engage with the lateral hooks 43 and to the hook 45 is connected the rubber band 46 which serves in well known manner for holding the head fast.

The hooks may be combined into a single eye with which the springs the rubber band and the setting lever all engage.

The arrangement may also be made in the form shown in Figs. 9 and 10 in which the lever 27 is shown slightly bent, so that it engages a plate 47 let into the head directly below the latter and the springs 48 can be arranged right at the top of the body. The rubber band 49 for securing the head, can be secured to an eye 50 formed on the lever 27.

In the construction shown in Fig. 11, on the previously described plate 32 are mounted pins 51 52 the other ends of which are let in into the body 29 and inclose the extension 26 between them thus forming a guide for the latter during the movement of the lever. The lever 27 is suitably connected to the extensions 26 for instance by means of widened portions 53 formed thereon which prevent it leaving the slots of the socket 26 through which it passes. The springs 54, also connected to the socket 26 and serving for the purpose already described, are in this case connected directly to the arm 55 of the doll.

In the construction shown in Fig. 12 the guide pins are formed into a loop 56 secured to the plate 32. The setting spring 57 which as before is connected to the arm 55, lies in front of the extension 26 so that it need not be specially secured to it, as it can be arranged above the loop 56 as shown in Fig. 13.

In the construction shown in Fig. 14 a separate setting spring 58 is used which partly surrounds the extension 26 and has its ends secured to the plate 32.

A special advantage of using the slotted extension 26 of the head, consists in the fact that the cords, rubber band or spring connecting the arms in the well known manner can be changed and directly utilized as a part of the setting mechanism.

In the construction shown in Fig. 15 the extension 26 is provided with lateral arms 59, so that lever 27 engages with all the four slots of the extension 26 to which the head is secured. In the arrangement just described, the lever 27 can in any case be easily connected either to the extension or to the guide pins in such manner that it cannot fall out.

In the arrangement shown in Figs. 16 and 17, the lever 27 is made in the form of a plate 60 and loosely incloses the extension 26 which in this construction, is made square, and is supported and guided by pins 56 secured to the plate 32. The springs 61 engaging at both sides of the plate 60 serve the same purpose as the spring 58 already described.

In the arrangement shown in Figs. 18 and 19 the spring is combined with guide pins in such manner that a single spring wire, bent several times, is used, the two ends 62 of which are soldered to the plate 32. The horizontal extension of the spring wire forms a guide for the plate portion 64 of the lever 27 and for the extension 26; the remaining portion of the wire is bent into loops 65 connected by a horizontal portion 66 which is secured to the front edge of the plate 64 by bending the latter as at 67 around the wire 66.

Another construction is shown in Figs. 20-22. In this case, the lever 27 is connected direct to a spring wire 68 the horizontal member 69 of which engages with the slots of the extension 26, and the ends of which again are soldered to the plate 32. The peculiar form of the spring can be seen in the figures. In the constructions shown in Figs. 18-22 the springs tend to press back the lever 27 and to bring it from the lateral into the central position.

The arrangement shown in Fig. 23 can be altered in such manner that the well known spring or rubber band used for holding fast the head (for instance the string or band 30 shown in Figs. 1 and 2) can be connected to the lever, and the lateral springs done away with. A pin 71 rigidly secured to the body, is formed into a setting lever 72 to correspond with the lever 27 already described and carries an eye 73 with which engages the rubber band or cord 74. The position shown in the drawing, is the normal position in which the lever 72 is placed with its slot on the back plate, and the stretched string 74 holds the head fast. If the lever is raised in the manner described, so that the slot is disengaged from the back plate, the tension of the string 74 will act in such manner that the head will bow. The turning movement is effected in the manner described.

It will be understood that instead of springs in every case rubber bands or the like may be used.

What I claim is:—

1. A doll having a head, a rod depending therefrom, a trunk into which the rod projects, a lever pivoted to the rod, means for locking the lever, and a spring for tilting the head when the lever is released, substantially as specified.

2. A doll having a body, a spring-influenced head, a notched lever operatively connected thereto, and a slotted back-plate adapted to be engaged by the notched lever and having a recess for permitting a longitudinal movement of said lever, substantially as specified.

Signed by me at Hanover, Germany, this 18th day of June 1906.

HERMANN FIEDELER.

Witnesses:
HENRY J. FULLER,
ANNA DIPPEL.